United States Patent [19]
Conway

[11] 3,960,712
[45] June 1, 1976

[54] HYDRODESULFURIZATION OF ASPHALTENE-CONTAINING BLACK OIL WITH A GAMMA-ALUMINA COMPOSITE CATALYST OF SPECIFIED PARTICLE DENSITY

[75] Inventor: John E. Conway, La Grange, Ill.

[73] Assignee: Universal Oil Products Company, Des Plaines, Ill.

[22] Filed: Jan. 8, 1975

[21] Appl. No.: 539,466

Related U.S. Application Data

[63] Continuation-in-part of Ser. No. 356,013, April 30, 1973, abandoned.

[52] U.S. Cl. ............................................. 208/216
[51] Int. Cl.² ........................................ C10G 23/02
[58] Field of Search ................................. 208/216

[56] References Cited
UNITED STATES PATENTS

| | | |
|---|---|---|
| 3,509,044 | 4/1970 | Adams et al. .................. 208/216 |
| 3,712,861 | 1/1973 | Rosinski et al. ................ 208/216 |
| 3,779,903 | 12/1973 | Levinson ......................... 208/216 |

Primary Examiner—Delbert E. Gantz
Assistant Examiner—G. J. Crasanakis
Attorney, Agent, or Firm—James R. Hoatson, Jr.; Thomas K. McBride; William H. Page II

[57] ABSTRACT

A process for effecting the desulfurization of asphaltene-containing black oil. The process utilizes a catalyst which comprises a composite of an alumina carrier material combined with one or more sulfided metallic components from Group VI-B and Group VIII wherein the catalyst particle density is within the range of from about 1.05 to about 1.24 grams per cubic centimeter. The use of the indicated catalyst particle density imparts additional desulfurization activity to the catalyst.

8 Claims, 1 Drawing Figure

Effect of Piece Density Upon The Relative Activity of an Alumina Catalyst Used For Desulfurization of Hydrocarbonaceous Black Oil.

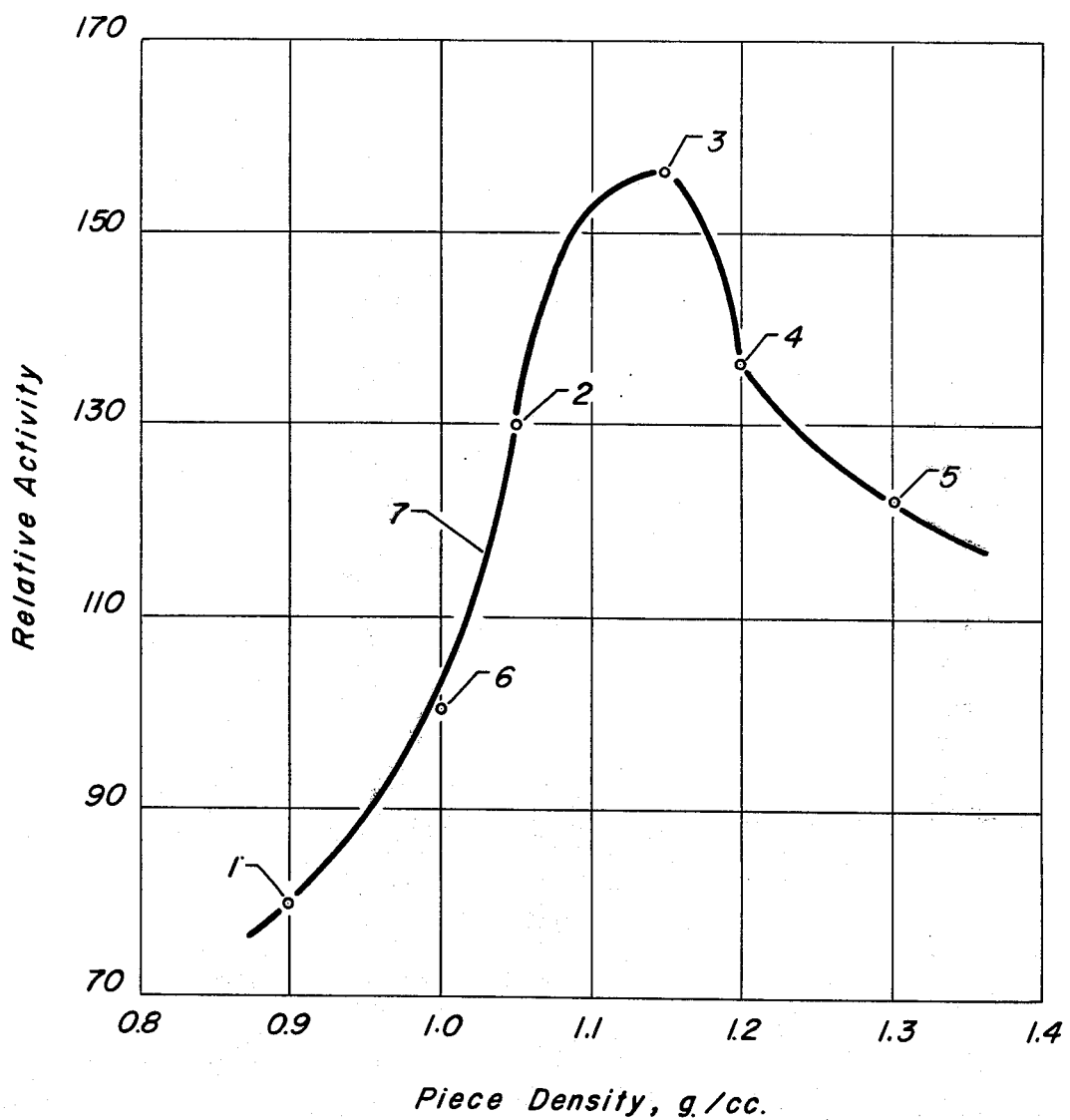
Effect of Piece Density Upon The Relative Activity of an Alumina Catalyst Used For Desulfurization of Hydrocarbonaceous Black Oil.

HYDRODESULFURIZATION OF ASPHALTENE-CONTAINING BLACK OIL WITH A GAMMA-ALUMINA COMPOSITE CATALYST OF SPECIFIED PARTICLE DENSITY

CROSS REFERENCE TO RELATED APPLICATIONS

The present invention is a continuation-in-part of my copending application, Ser. No. 356,013 filed Apr. 30, 1973, now abandoned, all the teachings of this application are incorporated herein by specific reference thereto.

The invention described herein relates to a process for the desulfurization of asphaltene-containing black oil. More specifically, the present invention is directed toward a process for effecting a reduction in the sulfur content of atmospheric tower bottoms products, vacuum tower bottoms products, crude oil residuum, topped crude oils, the crude oils extracted from tar sands and shale, and whole crude oil, all of which are sometimes referred to as "black oils," and which contain a significant quantity of asphaltenic material.

Petroleum crude oils, particularly heavy oils extracted from tar sands and topped or reduced crudes, contain high molecular weight sulfurous compounds in exceedingly large quantities. In addition, such crude or black oils contain excessive quantities of nitrogenous compounds, high molecular weight organo-metallic complexes consisting principally of nickel and vanadium, and asphaltenic material. The latter is generally found to be complexed, or linked with sulfur and, to a certain extent, with the organo-metallic contaminants. The utilization of these highly contaminated black oils, as a source of more valuable liquid hydrocarbon products, is precluded unless the sulfur and asphaltene content is sharply reduced, and such a reduction is not easily achieved by preferred techniques involving fixed bed catalytic processing.

The process encompassed by the present invention is particularly directed toward the catalytic desulfurization of petroleum crude oils while simultaneously converting about 50% of the asphaltenic material originally present. Specific examples of the crude or black oils to which the present invention is adaptable, include a sour Wyoming, full boiling range crude oil having a gravity of 23.2°API, and containing 2.8% by weight of sulfur and about 8.3% by weight of insoluble asphaltenes. A more difficult black oil to process is a vacuum tower bottoms product having a gravity of 7.1°API, and containing 4.05% by weight of sulfur and 23.7% by weight of asphaltenes. A topped Kuwait crude oil, having a gravity of 11°API, and containing 10.1% by weight of asphaltenes and 5.2% by weight of sulfur will, through the application of the present invention, experience a reduction of 50% of the asphaltenes and more than 80% reduction in sulfur concentration. The principal difficulty in achieving an economical fixed-bed catalytic processing technique for the desulfurization of black oils resides in the lack of sulfur stability of the catalytic composite employed, and arises primarily from the presence of asphaltenic material. This asphaltenic material comprises high molecular weight, non-distillable, oil insoluble coke precursors, which can be complexed with nitrogen, metals and especially sulfur. Generally, the asphaltenic material is found to be colloidally dispersed within the crude oil, and, when subjected to heat, as in a vacuum distillation process, has the tendency to flocculate and polymerize whereby the conversion thereof to more valuable oil-insoluble products becomes extremely difficult. Thus, in the heavy bottoms from a crude oil vacuum distillation column the polymerized asphaltenes exist as solid material useful only as road asphalt, or as an extremely low grade fuel when cut with distillate hydrocarbons such as kerosene, light gas oil, etc.

As is well known to those skilled in the art, solid catalysts have a propensity to accelerate desulfurization reactions and are widely used today within the petroleum and chemical arts. Prior art teaches that said solid catalysts may comprise porous refractory carrier materials such as naturally occurring aluminum silicates, various alumina-containing clays, sands, earths, zirconia, magnesia, thoria, boria, silica, alumina, titania, strontia, hafnia, etc. Additionally, the carrier materials preferably contain catalytically active metallic components selected from the metals and compounds of Groups VI-B and VIII of the Periodic Table of the Elements, Fischer Scientific Co., 1953. The metallic components of the catalyst are distinguished from those components which are employed as the solid support, or carrier material, and which are generally referred to as "refractory inorganic oxides." The metallic components of the prior art catalysts have been comprised of two or more of the above-mentioned metals and compounds thereof. Thus, the prior art catalysts may comprise chromium, molybdenum, tungsten, iron, cobalt, nickel, palladium, platinum, ruthenium, rhodium, osmium, iridium, nickel-molybdenum, nickel-chromium, molybdenum-platinum, cobalt-nickel-molybdenum, molybdenum-palladium, chromium-platinum, chromium-palladium, molybdenum-nickel-palladium, etc.

The prior art catalysts comprising the aforementioned support materials and metallic components have been recognized as advances in the catalytic promotion of the desulfurization of asphaltene-containing black oil. It is not my purpose to add to the list of the materials available in either of these categories, but rather the thrust of the present invention is grounded in a finding of a synergistic combination of alumina, a Group VIII metallic component, and a Group VI-B metallic component. I have now found a catalytic combination which exhibits a desulfurization activity substantially greater than the sum of the activity contributed by the alumina alone, the Group VIII component alone and the Group VI-B component alone.

Therefore, in a broad embodiment, the present invention relates to an improvement in a process for the catalytic hydrodesulfurization of an asphaltene-containing hydrocarbonaceous charge stock in which said charge stock and hydrogen are reacted with a catalytic composite comprising alumina having combined therewith a metal component from Group VI-B and a metal component from Group VIII in a reaction zone wherein the improvement comprises: the catalytic composite particle density is from about 1.05 to about 1.24 grams per cubic centimeter.

Another embodiment relates to a catalytic composite comprising alumina and having combined therewith a metal component from Group VI-B and a metal component from Group VIII wherein the catalytic composite particle density is from about 1.05 to about 1.24 grams per cubic centimeter.

It is an essential feature of the present invention that the catalytic support is alumina. It is preferred that the alumina material be porous, adsorptive, high surface area support having a surface area of about 25 to about 500 or more m.²/gm. Suitable alumina materials are the crystalline aluminas known as gamma-, eta-, and theta-alumina, with gamma-alumina giving best results. The preferred alumina is pure gamma-alumina. In fact, an especially preferred alumina material has surface area characteristics such as the average pore diameter is about 20 to about 300 Angstroms; the pore volume is about 0.1 to about 1 ml./gm., and the surface area is about 100 to about 500 m.²/gm.

The catalytic composites can be employed in any of the conventional types of equipment known to the art. One may, for example, employ the catalyst in the form of pills, pellets, granules, broken fragments, or various special shapes, disposed as a fixed bed within a reaction zone, and the charging stock may be passed therethrough in the liquid, vapor, or mixed phase, and in either upward or downward flow. Alternatively, I may prepare the catalyst in a suitable form for use in moving beds, in which the charge and catalyst are preferably passed in countercurrent flow; or in fluidized-solid processes, in which the charge stock is passed upward through a turbulent bed of finely divided catalysts; or in the suspensoid process, in which the catalyst is slurried in the charge stock and the resulting mixture is conveyed into the reaction zone. The reaction products from any of the foregoing processes are separated from the catalyst, vented to atmospheric pressure, and fractionated to recover the various components thereof.

Although the catalyst composite may exist in any convenient physical configurations, a particularly preferred form of the carrier material is the sphere; and spheres may be continuously manufactured by the well known oil drop method which comprises forming an alumina hydrosol, preferably by reacting aluminum metal with hydrochloric acid, combining the hydrosol with a suitable gelling agent such as hexamethylenetetramine (HMT), and dropping the resultant mixture into an oil column maintained at elevated temperatures. The droplets of the mixture remain in the oil column and typically are subjected to specific aging treatments in oil and an ammoniacal solution to further improve their physical characteristics. Alternatively, if the aging treatment is conducted at an elevated pressure, the treatment in an ammoniacal solution may be unnecessary. The resulting aged and gelled particles are then washed and dried at a relatively low temperature of about 300° to about 400°F. and subjected to a calcination procedure at a temperature of about 850° to about 1300°F. for a period of about 1 to about 20 hours or longer. This treatment effects conversion of the alumina hydrogel to the corresponding gamma-alumina. See U.S. Pat. No. 2,620,314 for additional details regarding this oil drop method.

A second essential component of the catalyst is the catalytically active components selected from the Group VI-B and Group VIII metals and their compounds. The catalytically active components may be incorporated in the catalytic composite in any suitable manner such as coprecipitation or cogellation with the alumina material, ion-exchanged with carrier material and/or alumina hydrogel, or impregnation either after and/or before calcination of the carrier material or in any other facile manner. The preferred method of preparing the catalyst involves the utilization of water soluble compounds of the Group VI-B and Group VIII metals to impregnate the carrier material. In addition it is generally preferred to impregnate the support after it has been calcined in order to minimize risk of washing away the valuable impregnating compounds; however, in some cases it may be advantageous to impregnate the support when it is in the gelled state.

Generally, the amount of the catalytically active components, Group VI-B and Group VIII metals and compounds thereof, present in the final catalyst is small compared to the quantities of the other components combined therewith. In fact, the Group VIII component generally comprises about 0.05 to about 5% by weight, preferably about 0.1 to about 3% by weight, of the final catalytic composite calculated on an elemental basis. The Group VI-B component comprises about 0.05 to about 15% by weight, preferably about 0.5 to about 12% by weight of the final catalytic composite calculated on an elemental basis.

Regardless of the details of how the components are combined with the carrier material, the final catalyst generally will be dried at a temperature of from about 200° to about 600°F. for a period of from about 2 to 24 hours or more and finally calcined at a temperature of about 700° to about 1100°F. for a period of about 0.5 to about 10 hours, and preferably about 1 to about 5 hours.

Although the overall method for preparing the catalytic composite is not considered an essential feature of my invention, it is necessary that the metallic components be sulfided prior to being placed in service for the desulfurization of hydrocarbonaceous feed stocks. It must be acknowledged that a wide variety of sulfiding techniques are well known and well described in the literature; however, one sulfiding technique is particularly preferred whereby following calcination, an inert gas is utilized to sweep the composite free from excess oxygen and the composite reduced in an atmosphere of substantially dry hydrogen at a temperature from about 400° to about 1100°F. The time for the reduction technique is generally short, ranging from about 0.5 to about 10 hours. The substantially reduced composite is initially contacted with a stream of hydrogen and hydrogen sulfide in which the hydrogen/hydrogen sulfide mole ratio is at least 1.5:1 with an upper limit of about 15:1 at a temperature from about 500° to about 1200°F. until equilibrium conditions are reached. Improved results are obtained when the sulfided catalyst contains from about 0.05 to about 1.5 % by weight of sulfur and more preferably from about 0.2 to about 0.8 % by weight of sulfur.

In some instances, generally dependent upon the ultimately desired result, the catalytic composite may contain a halogen component, the precise form of the association thereof with the carrier material not being accurately known. However, the prior art indicates that it is customary to refer to the halogen component as being combined therewith, or with the other ingredients of the composite, and it is therefore, commonly referred to as combined halogen or combined halide. The halogen may be either fluorine, chlorine, iodine, bromine or mixtures thereof, with fluorine or chlorine being particularly preferred. The halogen component may be added to the carrier material in any suitable manner, either during the preparation thereof, or before or after the addition of the other catalytically active components. When utilized, a halogen component will be composited in such a manner as results in a final composite containing about 0.1 to about 1.5% by weight and preferably from about 0.4 to about 0.9% by weight, calculated on an elemental basis.

Desulfurization conditions are intended to be those conditions imposed upon the conversion zones in order to reduce the residual sulfur of the black oil to about 1.5 wt.% or less. Since the desulfurization reaction is exothermic, the temperature increases through the catalyst and the reaction zone effluent will be at a temperature higher than the temperature at the inlet to the catalyst bed. Hydrogen is mixed with the charge stock in an amount of from about 1,000 to about 20,000 scf./bbl., at the selected operating pressure. The operating pressure will be greater than 1000 psig. and generally in the range of about 1,500 to about 4,000 psig. The black oil passes through the catalyst at a liquid hourly space velocity (defined as volumes of liquid hydrocarbon charge per hour, measured at 60°F., per volume of catalyst disposed in the reaction zone) of from about 0.2 to about 5. It is particularly preferred to introduce the mixture of black oil and hydrogen into the reaction vessels in such a manner that the same passes through a downward flow. The internals of the various reaction vessels may be constructed in any suitable manner capable of providing the required intimate contact between the liquid charge stock, the gaseous mixture and the catalyst. In some instances, it may be desirable to provide the reaction zone with a packed bed of inert material such as particles of granite, porcelain, Berl saddles, sand, aluminum or other metal turnings, etc., to facilitate distribution of the charge, or to employ perforated trays or special mechanical devices for this purpose.

Previously it was felt that the particle density had no direct bearing on the effectiveness of a catalyst to hydrodesulfurize an asphaltene-containing hydrocarbonaceous feed stock. Thus, it was entirely unexpected that relative catalyst activity could be greatly improved by utilizing a piece density within a critical range.

Prior art catalysts have been developed which are designed to effectively remove less than 70% of the sulfur contained in the black oil feed stock. These catalysts no longer meet the requirements of industrialized nations which are attempting to alleviate air pollution caused by the combustion of high sulfur black oil. Today many nations require that black oil fuel contain less than 0.5 weight % or even less than 0.2 weight % sulfur which demands that process units capable of 90% or more desulfurization be available if virgin black oil containing 5 weight % is ever to be utilized as a fuel. These out moded catalysts contained in the prior art serve no purpose in guiding those skilled in the art to discover new catalysts which are required for the new generation processing units.

Prior catalysts have been developed which are designed to effectively remove metallic impurities encountered in hydrocarbon stocks to an acceptable and desired level before further treating the charge stocks to effect upgrading to desired products. The disclosure of these developments lend little insight to those skilled in the art in the discovery of an outstanding desulfurization catalyst which owes its superior qualities to piece density.

During the initial stages of development to produce a highly effective catalyst for the deep desulfurization of asphaltene-containing hydrocarbonaceous charge stocks, a cobalt-molybdenum-alumina catalyst which was highly effective for the desulfurization of distillate charge stocks, especially vacuum gas oils, failed to efficiently achieve 85% removal of sulfur from a reduced crude. The physical characteristics of the distillate charge stock catalyst had been adjusted to maximize its desulfurization ability but such adjustments were not suitable for deep desulfurization of asphaltene-containing hydrocarbonaceous charge stocks. The prior art teaches that the pore diameter and the surface area of catalytic particles could be modified to improve the performance of desulfurization catalysts but there is no suggestion in the art that the selection of a particular catalyst piece density would further improve desulfurization catalysts and particularly catalysts for the deep desulfurization of asphaltene-containing hydrocarbonaceous charge stock.

I have discovered that if the density of individual catalyst particles used for the desulfurization of heavy hydrocarbonaceous charge stocks is in the range of from about 1.05 to about 1.24 grams per cubic centimeter, the degree of desulfurization is unexpectedly high. Notwithstanding that catalytic black oil desulfurization processes abound in the prior art, there has been no teaching of the fact that the density of the catalytic particles must range from about 1.05 to about 1.24 g./cc.

This criticality of catalyst particle density is illustrated in the accompanying drawing, relating to the catalyst employed for the purpose of desulfurizing hydrocarbonaceous black oil. The data utilized in formulating said drawing was obtained in accordance with the specific example hereinafter set forth. Briefly, however, with reference to the drawing, data points 1, 2, 3, 4, 5, 6, through which curve 7 is drawn were obtained by processing a Middle East reduced crude containing 5 weight % sulfur.

The six catalysts utilized in the example were comprised of alumina spheres containing 2 weight % cobalt and 8 weight % molybdenum (with the exception that catalyst number 6 had 12 weight % molybdenum) based on the elemental metal but each batch of catalyst prepared for the example had a different piece density ranging from 0.9 to 1.3 g./cc.

The character of the curve in the drawing is unusual and totally unexpected in view of the teachings or the lack of teachings of the prior art respecting the density of the carrier material and subsequently the density of the finished catalyst particle. It has been clearly shown that the degree of desulfurization of heavy hydrocarbonaceous black oils is not simply a matter of random selection of the catalytic particle density but that unexpected benefits arise as a result of utilizing a particular, narrow range of particle density.

It is understood that the broad scope of the present invention is not to be unduly limited to the particular catalytically active metallic component or components with respect to the catalyst disposed within the reaction zone. Similarly, the improvement encompassed by the present invention is not intended to be limited to a particular flow pattern and/or set of operating conditions within the reaction zone.

As hereinbefore set forth, the process of the present invention is particularly directed to the processing of heavy hydrocarbonaceous materials. However, it is most advantageously applied to hydrocarbonaceous black oils. Such feed stocks include crude oils, tar sand extract, shale oil, topped or reduced crudes, vacuum tower bottoms, etc.

In the example hereinafter set forth, reference is made to a "Relative Activity" test method. The relative activity of a particular catalyst is defined as the ratio of the space velocity required to result in a given product improvement, e.g., desulfurization, while employing the test catalyst, to the space velocity required to yield the same degree of product improvement while employing a primary, standard catalyst, which relative activity is expressed as a percentage. The catalyst employed as the standard catalyst was an alumina-cobalt-molybdenum composite consisting of 2 weight % cobalt and 12 weight % molybdenum with a particle density of 1.0 g./cc. and designated catalyst number 6. The above-mentioned standard catalyst was reduced and presulfided before the desulfurization operation was performed. The product quality improvement was measured in terms of the residual sulfur content of the liquid product.

The relative activity test consists essentially of processing a particular Middle East reduced crude which has an initial boiling point of 480°F. and a 50% boiling point of 948°F. Additional feed stock inspection data are presented in Table I.

TABLE I

| Middle East Reduced Crude Feed Stock Inspection | |
|---|---|
| API at 60°F. | 14.1 |
| IBP °F. | 480 |
| 5% | 562 |
| 10% | 628 |
| 30% | 800 |
| 50% | 948 |
| 58% | 1020 |
| Sulfur, Wt. % | 5.0 |
| V, Wt. ppm. | 56 |
| Ni, Wt. ppm. | 23 |
| $C_7$ Insolubles, Wt. % | 8.86 |

The standard catalyst was placed in a reaction zone in an amount of 400 cubic centimeters and a hydrogen pressure of 1800 psig. was imposed thereon. The catalyst bed inlet temperature was maintained at 720°F. and hydrogen was passed therethrough in an amount of 5000 standard cubic feet per barrel of liquid charge. Three distinct test procedures were effected at various liquid hourly space velocities within the range of 0.4 to 1.5. The liquid effluent, upon which the product inspection was made, was collected over a period of operation of 16 hours. The sulfur concentration in each of the three liquid products was plotted on a logarithmic scale against the reciprocals of the three space velocities employed. From the resulting curve, drawn through the three points, a determination was made of the reciprocal of the space velocity required to yield a liquid product having a residual sulfur content of 1 weight %. The relative activity of the test catalyst was derived from the ratio of the reciprocal space velocity, to yield 1 wt.% sulfur, in regard to the primary standard catalyst and compared to that of the catalyst being tested. The ratio was multiplied by the factor of 100, and a relative activity factor greater than 100% indicated a test catalyst having a greater activity than the primary standard catalyst: obviously, a catalyst having a relative activity less than 100%, was less active than the primary standard catalyst.

The following example is given to further illustrate the process of the present invention and to indicate the benefits to be afforded through the utilization thereof. It is understood that the example is given for the sole purpose of illustrating the means by which curve 7 in the accompanying drawing was obtained; it is not intended to limit the generally broad scope and spirit of the appended claims.

EXAMPLE I

The data presented in this example is pertinent to the accompanying drawing, and the latter should be referred to in conjunction with the following discussion. The hydrocarbon charge stock utilized in the test procedure for evaluating desulfurization catalytic composites was the Middle Eastern reduced crude whose inspection was hereinbefore set forth in Table I. Catalyst portions in an amount of 400 cc. were employed in a reaction zone fabricated from stainless steel and were maintained under an imposed pressure of 1800 psig. The catalyst was maintained at a temperature of 720°F. and the charge stock was admixed with hydrogen in an amount of 5000 scf./bbl. The space velocity was adjusted by varying the charge rate to produce a product which contained 1 weight % residual sulfur. The reciprocal of the space velocity could then be compared with that of the standard catalyst as hereinabove described to determine the relative activity of the test catalyst.

Five separate alumina hydrosol mixtures were prepared by dissolving 99.9% pure pelleted aluminum in 30% hydrochloric acid which mixtures had Al/Cl ratios of from 1.09 to 1.27. The hydrosol mixtures were formed into spherical hydrogel particles in accordance with the well known oil drop method as detailed in U.S. Pat. No. 2,620,314, issued to James Hoekstra. The hydrogel particles were pressure aged at temperatures of from 275° to 315°F., then dried at a temperature of about 200°F., and thereafter calcined at a temperature of about 1100°F. The alumina hydrosol which had the lowest Al/Cl ratio produced carrier material with the highest particle density. Also, it was noted that for alumina hydrosol which had Al/Cl ratios less than 1.25, a pressure aging temperature of 285°F. produced the highest particle density. The pressure aging step was performed at a pressure of 100 psig. which is sufficient to maintain the system in the liquid phase.

The aluminum/chloride ratio of the alumina sol was selected together with the temperature for the pressure aging step to vary the carrier particle density of each batch. Each batch of carrier material was subsequently impregnated with water soluble salts of cobalt and molybdenum and, each batch of finished catalyst contained 2 weight % cobalt and 8 weight % molybdenum. Consequently, five batches of finished catalyst were produced which had particle densities of 0.9, 1.05, 1.15, 1.2 and 1.3 g./cc., respectively.

The resultant batches of catalyst were subjected to a substantially water-free reduction technique. Substantially pure and dry hydrogen (less than about 30 ppm. of water) was employed as the reducing agent. The calcined composite was contacted at a temperature of about 1000°F. and for a period of about 8 hours, and effective to substantially reduce the metallic components to their elemental state. The reduced batches of catalyst were subjected to a presulfiding operation for the purpose of incorporating therewith about 0.8 percent by weight of sulfur, on an elemental basis. The presulfiding treatment was effected in the presence of a sulfiding gas having about 10 moles of hydrogen per mol of hydrogen sulfide at a temperature of about 500°F. The hereinabove mentioned standard catalyst was reduced and presulfided in the same manner as the test catalysts.

Four hundred cubic centimeters of finished catalyst from each batch of reduced and presulfided test catalyst was placed in a reaction zone and a hydrogen pressure of 1800 psig. was imposed thereon. A Middle East reduced crude, more fully described hereinbefore in Table I, was charged to the reaction zone in admixture with hydrogen at a hydrogen circulation rate of 5000 scf./bbl. of liquid charge and at a temperature of 720°F. The space velocity of the liquid charge was adjusted to yield a product effluent which had a residual sulfur level of 1 weight %.

The experimentally obtained space velocity for each batch of test catalyst was then compared with that of the test catalyst in order to determine the relative activity of the test catalysts.

The following Table II indicates the catalyst designation (having reference to the datum points of the accompanying drawing), the piece density and the relative activity. Catalyst number 6 was the standard catalyst.

TABLE II

| Catalyst No. | Piece Density, g./cc. | Relative Activity |
|---|---|---|
| 1 | 0.9 | 80 |
| 2 | 1.05 | 130 |
| 3 | 1.15 | 156 |
| 4 | 1.20 | 136 |
| 5 | 1.30 | 122 |
| 6 | 1.0 | 100 |

From the data presented in foregoing Table II and with reference to the accompanying drawing, it will be seen that unexpected and extremely high activities are obtained by the adjustment of the catalyst piece density within a narrow critical range. The data presented in Table II were employed in preparing curve 7 of the drawing. A Relative Activity of 130 is considered to be the minimum at which a catalyst must perform to yield efficient deep desulfurization of black oils; thus, this activity is likely criteria to use for evaluation. Therefore, from the drawing, it can be seen that a catalyst with an activity greater than 130 has a piece density within the range from about 1.05 to about 1.24 g./cc. The criticality attached to this range of piece density is readily ascertained by the character of the curve, in that a piece density less than 1.05 or greater than 1.24 produces a catalyst which has an activity less than 130, which is not well-suited for deep desulfurization of black oils.

The additional economic advantages afforded through this particular result will be readily recognized by those possessing skill within the art of petroleum refining, and particularly those involving the desulfurization of heavy black oils intended for subsequent processing.

The foregoing specification and example clearly illustrate the improvement encompassed by the present invention and the benefits to be afforded a process for the production of a low-sulfur black oil from a sulfur-containing, high-boiling hydrocarbon charge stock.

I claim as my invention:

1. In a process for the catalytic hydrodesulfurization of an asphaltene-containing hydrocarbonaceous charge stock in which said charge stock and hydrogen are reacted with a sulfided catalytic particle composite of alumina having combined therewith a metal from Group VI-B and a metal from Group VIII in a reaction zone, the improvement which comprises said catalytic composite particle having a density of from about 1.05 to about 1.24 grams per cubic centimeter wherein the alumina support of said catalyst is gamma-alumina which has an average pore diameter of about 20 to about 300 Angstroms, a pore volume of about 0.1 to about 1 ml./gm., and a surface area of about 100 to about 500 m$^2$/gm.

2. A process according to claim 1 further characterized in that said Group VI-B metal is molybdenum.

3. A process according to claim 1 further characterized in that said Group VIII metal is cobalt.

4. A process according to claim 1 further characterized in that said Group VI-B metal is present in an amount from about 0.05 to about 15 weight % calculated on the final catalyst composite.

5. A process according to claim 1 further characterized in that said Group VIII metal is present in an amount from about 0.05 to about 5 weight % calculated on the final catalyst composite.

6. A process according to claim 1 further characterized in that said composite contains from about 0.05 to about 1.5 weight % sulfur.

7. A process according to claim 1 further characterized in that at least 80% of the sulfur in said asphaltene-containing hydrocarbonaceous charge stock is removed.

8. A process according to claim 1 further characterized in that at least 90% of the sulfur in said asphaltene-containing hydrocarbonaceous charge stock is removed.

* * * * *